Patented Jan. 9, 1934

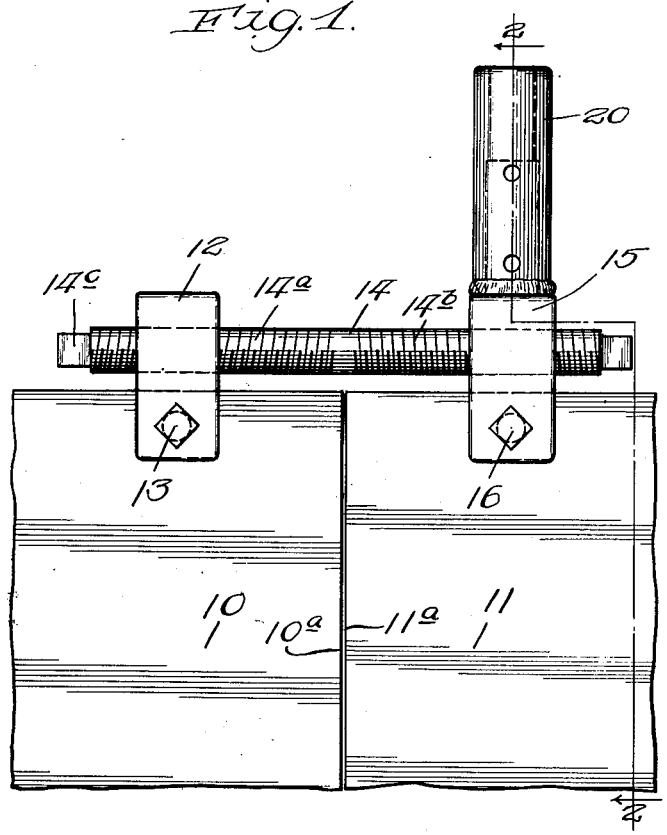
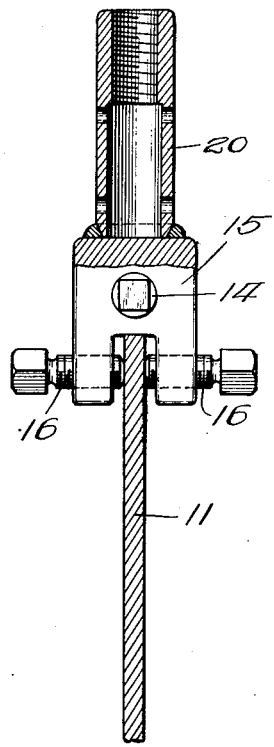
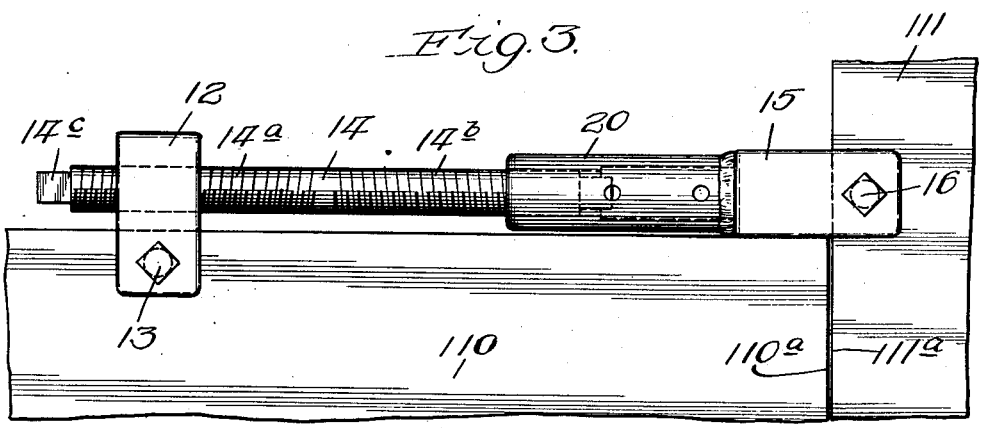

1,942,463

UNITED STATES PATENT OFFICE 1,942,463

MOKUM

Djalma D. Williams, Dallas, Tex., assignor to Chicago Bridge & Iron Company, Chicago, Ill., a corporation of Illinois Application January 12, 1933. Serial No. 651,441

1 Claim. (Cl. 113—99)

This invention relates to improvement in mokum or device for use to assist in the welding of seams of structures made of sheet metal. The device may be used, for example, in welding the seams between the plates of welded tanks.

For the purpose of illustrating the invention, I have shown the same adapted for use in connection with the butt-welding of vertical seams between plates.

Among the features of my invention is the provision of a device used at the top of a vertical seam to push the plates apart or pull them together, as required, in order to bring them into the proper positions for welding. Another feature of the invention is the provision of such a device that can be used on the upper edges of plates where such edges register and also where there is not such registry. In the latter case, means are provided for attaching one of the dogs forming a part of the device to the vertical edge of an adjacent plate which projects somewhat higher than the plate to which it is to be welded.

Other features and advantages of my invention will appear more fully as I proceed with my specification.

In that form of device embodying the features of my invention shown in the accompanying drawing—

Figure 1 is a view in side elevation; Fig. 2 is a view taken as indicated by the line 2 of Fig. 1; and Fig. 3 is a view similar to Fig. 1, showing one of the dogs in another position.

As shown in Figs. 1 and 2, 10 and 11 may be two plates, the adjacent vertical edges 10ª and 11ª of which are to be welded.

My improved mokum includes a dog 12 with means for fastening the same to the upper edge of the plate 10. As here shown, such means includes two clamping screws 13, 13 adapted to engage the upper edge of the plate 10 on the outside and the inside. The dog 12 is provided with a threaded hole adapted to receive the threaded end 14ª of a bar 14.

15 indicates a second dog similar to 12 and likewise provided with clamping screws 16, 16 adapted to mount the same on the upper edge of the plate 11. This second dog is provided with a reversely threaded hole adapted to receive the oppositely threaded end 14ᵇ of the bar 14. The ends of the bar 14 are squared, as indicated by 14ᶜ, to receive a wrench for rotating the same.

In the use of the device on plates as shown in Figs. 1 and 2, the dogs are clamped in position, as shown, and then the screw 14 may be rotated in one direction or the other to move the dogs toward or away from each other. This will serve to bring the edges 10ª and 11ª of the two plates 10 and 11 into the correct position for welding.

The dog 15 is provided with an extension 20 having therein a second threaded hole substantially at right angles to the other one. The use of this extension is illustrated in Fig. 3. As here shown, one of the plates 111 extends upwardly somewhat further than the other plate 110. The vertical edges 110ª and 111ª are to be welded. The dog 12 is attached to the upper edge of the plate 110 by means of the clamping screws 13. The dog 15 is then clamped to the vertical edge of the plate 111 by means of the clamping screws 16. This will place the extension 20 in line with the threaded hole in the dog 12. The bar 14 is then rotated to move the dogs toward or away from each other to bring the edges 110ª and 111ª of the two plates into proper position for welding.

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as permissible, in view of the prior art.

What I regard as new, and desire to secure by Letters Patent, is:

A device of the character described, including; a dog with a threaded hole therein; means for fastening said dog to the edge of a plate with said threaded hole substantially parallel with said edge; a second dog with a reversely threaded hole therein, said dog being provided with a second threaded hole substantially at right angles to the first-mentioned threaded hole therein; means for similarly fastening said second dog to the edge of an adjacent plate; a bar with its ends oppositely threaded and adapted for engagement with the threaded holes in said dogs; and means for rotating said bar, whereby said dogs may be moved toward or away from each other.

DJALMA D. WILLIAMS.